No. 852,834. PATENTED MAY 7, 1907.
W. H. GRANSDEN.
IDLE TIRE HOLDER.
APPLICATION FILED JAN. 30, 1907.

Witnesses:
Chas. E. Gaylord.
John Enders.

Inventor:
William H. Gransden,
By Dyrenforth, Dyrenforth, Lee & Wiles,
Att'ys.

THE NORRIS PETERS CO., WASHINGTON, D. C.

UNITED STATES PATENT OFFICE.

WILLIAM H. GRANSDEN, OF CHICAGO, ILLINOIS, ASSIGNOR TO APPLIANCE MANUFACTURING COMPANY, OF CHICAGO, ILLINOIS, A CORPORATION OF ILLINOIS.

IDLE-TIRE HOLDER.

No. 852,834.   Specification of Letters Patent.   Patented May 7, 1907.

Application filed January 30, 1907. Serial No. 354,945.

*To all whom it may concern:*

Be it known that I, WILLIAM H. GRANSDEN, a citizen of the United States, residing at Chicago, in the county of Cook and State of Illinois, have invented a new and useful Improvement in Idle-Tire Holders, of which the following is a specification.

My invention relates to an improvement in idle-tire holders for releasably securing on vehicles, and more particularly on automobile bodies, the fifth or idle-tire usually carried for use in case of emergency, where substitution of a new tire is desired.

One of my objects is to provide a construction in the class of holders referred to which will effectively perform the tire-holding function and serve to retain the tire against unauthorized removal, and which, when not required for use, may, as to the parts liable to be in the way and subject to injury, be readily detached from the vehicle without requiring the use of tools.

Further objects are to provide a simple and inexpensive construction of tire-holder and one which will permit of use for holding tires of different sizes.

The preferred form of embodiment of my invention is illustrated in the accompanying drawing, in which—

Figure 1:
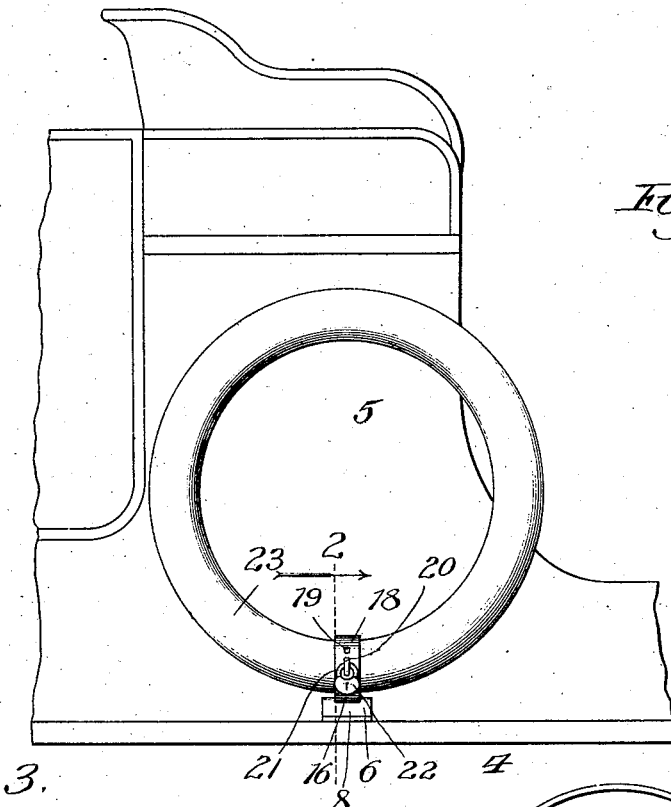
Figure 3:
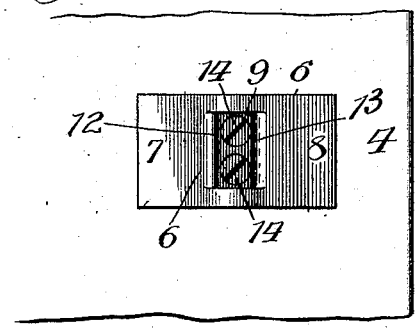
Figure 2:
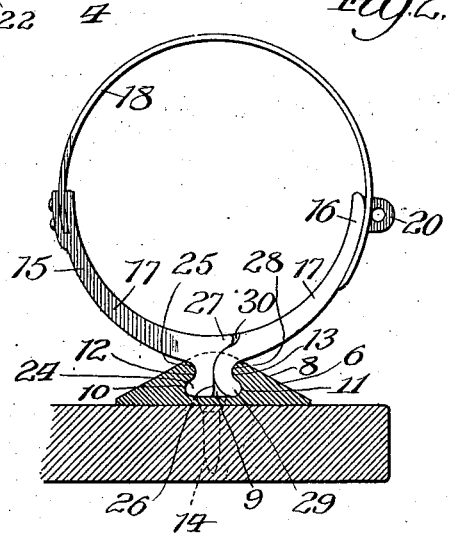

Figure 1 is a broken view in side elevation of an automobile-body equipped on its running-board with my improved tire-holder, and showing an idle-tire secured in the holder in vertical position at the side of the body; Fig. 2, an enlarged broken section taken at the line 2 on Fig. 1 and viewed in the direction of the arrow, but with the tire removed from the holder; and Fig. 3, a top plan view of the socket-member showing a portion of the running-board to which it is attached.

On the running-board 4 of an automobile-body is secured a socket-member 6 having two inclined faces 7 and 8, converging toward each other and extending transversely of the running-board. The member 6 is centrally provided with an elongated upwardly-opening socket 9 extending longitudinally of said running-board, and having undercut side-walls 10 and 11 preferably of the shape in cross-section represented in Fig. 2, affording the rounded shoulders 12 and 13, respectively, which together produce a constriction of the inlet to the socket-opening. The member 6 may be secured to the running-board by any suitable means, but preferably by screws 14 or bolts, passed through the base of the socket 9 into the running-board. When the member 6 is so secured and the arms are assembled on it, as hereinafter described, removal of the attaching screws 14 is effectually obstructed.

15 and 16 are tire-holding arms of a width at their lower ends approximating the length of the socket 9 and each of the general curved shape illustrated, to afford, when assembled, as hereinafter explained, an upwardly-opening semi-circular tire-seat 17. To the upper end of the arm 15 is secured one end of a strap 18, preferably of metal, having its opposite end provided with a longitudinal series of elongated openings 19, at any one of which the strap is adapted to fit over an eye 20 formed on the outer end of the arm 16, for receiving the bolt 21 of a padlock 22 for locking a tire 23 in the holder.

The lower end of the arm 15 is provided with an outwardly projecting shoulder 24 and above the latter with a recess 25, said shoulder and recess corresponding in shape to the cross-sectional shape of the adjacent undercut wall 10 and shoulder 12 of the socket-member 6, and the opposite side of the arm 15 is formed with a flat surface 26 which develops into the curved underside of an extension 27, affording at its extremity a stop. The lower end of the arm 16 is of general hook-shape with its outer side having formed in it, a recess 28, and its lower end provided with an outwardly-curved shoulder 29, said recess and shoulder corresponding in shape, respectively, with the shape in cross-section of the shoulder 13 and undercut wall 11, of the socket-member 6. On the inner side of the arm 16 is provided a recess 30 which co-operates with the end of the extension 27 to stop the arms against turning inwardly when positioned in the socket-member.

The manner of using my tire-holder is as follows: With the socket-member 6 secured to the running-board 4 in the position indicated in Fig. 1, the arm 15 is first inserted at its shouldered end into the socket 9, as shown in Fig. 2, to cause its shoulder 24 and recess 25 to fit the adjacent undercut wall 10 and shoulder 12, respectively, of the socket-member. With the arm 15 thus in position, the arm 16 is inserted at its hook-end into the socket by introducing this end into the space between the arm-extension 27 and socket-shoulder 13, while its outer end is caused to occupy a position below the socket-member 6. The arm 16 is then raised at its outer end to swing its inner end on the shoulder 13, as a fulcrum, thereby turning its hook-end into the undercut wall 11 and engage therewith when the arm is turned to the tire-holding position, as illustrated in Fig. 2, in which position the arms, thus interlocked, form a seat for the tire. The strap 18 may then be adjusted about the tire and locked in place as by a padlock 22. With the tire thus held between the arms and strap the removal of the arms from the socket 9 is prevented owing to the interlocking engagement of the shoulders on the arms with the undercut socket walls. If necessary any suitable supplementary fastening means for the tire may be employed, as, for example, the common form of strap (not shown). The arms may be readily disengaged from the socket-member when no tire is confined in the holder, by reversing the described operation of assembling, namely, by first lowering the outer end of the arm 16 to withdraw its shouldered end from the undercut wall 11 and then lifting it entirely out of the socket, whereupon the withdrawal of the arm 15 from the socket 9 may be readily effected. Thus I provide a simple construction of tire-holder which does not require, in the assembling or dismantling of its parts, the use of any tools, and which when dismantled renders the vehicle-body free of any obstruction which might be impaired or injured in any way, as, for example, by stepping upon or knocking against it.

What I claim as new and desire to secure by Letters Patent is—

1. In combination with a vehicle-body, a tire-holder comprising a socket-member on said body, tire-retaining arms adapted to enter said socket, and mutually interlocking means on said member and arms operating to prevent the withdrawal of said arms from the socket when the arms are in tire-holding position.

2. In combination with a vehicle-body, a tire-holder comprising a socket-member on said body provided with undercut walls, and tire-retaining arms provided with shouldered ends at which they are adapted to enter said socket when the arms are out of the tire-holding position, and to engage at their shoulders said undercut walls to retain the arms against removal from the socket when they are in the tire-holding position.

3. In an idle-tire holder, the combination of a socket-member adapted to be secured to a vehicle-body, tire-retaining arms adapted to enter said socket, and mutually interlocking means on said member and arms adapted to engage with each other to prevent the withdrawal of the arms when in their tire-holding position.

4. In an idle-tire holder, the combination of a socket-member adapted to be secured to a vehicle-body and having undercut walls, and tire-engaging arms provided on corresponding ends with shoulders and adapted to be inserted into said socket when the arms are out of tire-holding position, and to engage at their shoulders with said undercut walls when the arms occupy their tire-holding position.

5. In an idle-tire holder, the combination of a socket-member adapted to be secured to a vehicle-body and provided with undercut socket-walls, and tire-engaging arms, one of which is provided on its outer surface at one end with a shoulder adapted to fit one undercut wall of said socket, and the other of said arms being formed with a hook-end adapting it to be inserted into and turned in said socket to introduce its hook-shaped end into the other undercut wall of the socket, for the purpose set forth.

6. In an idle-tire holder, the combination of a socketed base-member having inclined upper surfaces and provided with undercut socket-walls, and a pair of curved tire-retaining arms, each provided at its lower end with a shoulder adapted to enter the socket and engage an undercut wall, for the purpose set forth.

7. An idle-tire holder comprising, in combination, a socket-member adapted to be secured to a vehicle body, tire-retaining arms forming a tire-seat and adapted to enter said socket, mutually interlocking means on said member and arms adapted to engage with each other to prevent the withdrawal of the arms when in their tire-holding position, a strap engaging with said arms and co-operating with them for holding a tire, and means for locking said strap to said arms.

8. An idle-tire holder comprising, in combination, a socketed base-member having inclined upper surfaces and provided with undercut walls, a pair of curved tire-retaining arms, each provided at its lower end with a shoulder adapted to enter the socket and engage an undercut wall, a strap secured to one of said arms and adapted to be releasably fastened to the other of said arms, and means for locking the strap to the arms, for the purpose set forth.

WILLIAM H. GRANSDEN.

In presence of:
W. B. DAVIES,
J. H. LANDES.